United States Patent
Bause et al.

(10) Patent No.: US 7,182,802 B2
(45) Date of Patent: Feb. 27, 2007

(54) EVAPORATIVE EMISSIONS FILTER

(75) Inventors: Daniel E. Bause, Flanders, NJ (US); Ronald P. Rohrbach, Flemington, NJ (US); Richard J. Berkey, Toledo, OH (US); Bryon W. Stremler, Mississauga (CA); Robert L. Smith, Hinckley, OH (US); Peter D. Unger, Convenet Station, NJ (US); Gary B. Zulauf, Findlay, OH (US)

(73) Assignee: Honeywell International, Inc., Morris Township, NJ (US)

(*) Notice: Subject to any disclaimer, the term of this patent is extended or adjusted under 35 U.S.C. 154(b) by 0 days.

(21) Appl. No.: 10/392,044

(22) Filed: Mar. 19, 2003

(65) Prior Publication Data

US 2004/0182240 A1 Sep. 23, 2004

(51) Int. Cl.
*B01D 53/04* (2006.01)
*F02M 33/02* (2006.01)

(52) U.S. Cl. ............................. 95/146; 96/130; 96/135; 96/143; 96/147; 96/153; 55/385.3; 55/DIG. 28; 123/518

(58) Field of Classification Search ............... 55/385.1, 55/385.3, DIG. 28; 95/143, 146, 148; 96/108, 96/121, 130–139, 143, 144, 147, 151, 153, 96/154; 123/518, 519
See application file for complete search history.

(56) References Cited

U.S. PATENT DOCUMENTS

| | | | | |
|---|---|---|---|---|
| 2,201,628 A | | 11/1938 | McCormick et al. | |
| 3,093,124 A | * | 6/1963 | Wentworth | 123/519 |
| 3,191,587 A | * | 6/1965 | Hall | 123/519 |
| 3,352,294 A | * | 11/1967 | Skarstrom et al. | 123/519 |
| 3,368,326 A | * | 2/1968 | Hervert | 96/109 |
| 3,393,669 A | | 7/1968 | Vardi et al. | |
| RE26,530 E | * | 3/1969 | Wentworth | 123/519 |
| 3,540,423 A | | 11/1970 | Tolles | |
| 3,541,765 A | * | 11/1970 | Adler et al. | 96/138 |
| 3,563,007 A | * | 2/1971 | Clarke | 96/112 |
| 3,572,013 A | * | 3/1971 | Hansen | 96/138 |
| 3,572,014 A | * | 3/1971 | Hansen | 96/138 |
| 3,646,731 A | * | 3/1972 | Hansen | 96/136 |
| 3,678,663 A | | 7/1972 | Hansen | |
| 3,849,093 A | | 11/1974 | Konishi et al. | 55/316 |
| 4,070,828 A | | 1/1978 | Barres | 60/274 |
| 4,085,721 A | | 4/1978 | Vardi et al. | |

(Continued)

FOREIGN PATENT DOCUMENTS

| | | |
|---|---|---|
| DE | 250469 A1 | 6/1986 |
| DE | 101 02 604 | 7/2002 |
| EP | 1 273 789 | 1/2003 |
| JP | 405253439 | 10/1993 |
| WO | WO 99/56859 | 11/1999 |
| WO | WO 03/008068 A1 | 1/2003 |
| WO | WO 2004/101963 A1 | 11/2004 |

OTHER PUBLICATIONS

International Search Report for PCT/US2005/030779 dated Jul. 13, 2006.

(Continued)

*Primary Examiner*—Frank M. Lawrence

(57) ABSTRACT

An evaporative emissions filter for an engine air induction system. The evaporative emissions filter includes a hydrocarbon vapor-adsorbent member disposed within the air induction system. A mechanism is provided for mounting the evaporative emissions filter within the air induction system. Hydrocarbon vapors present in the air induction system after engine shut-down are substantially retained in the adsorbent member until air flows through the air induction system after the engine starts.

18 Claims, 1 Drawing Sheet

U.S. PATENT DOCUMENTS

| | | | |
|---|---|---|---|
| 4,136,650 A | | 1/1979 | Manookian, Jr. |
| 4,217,386 A | | 8/1980 | Arons et al. |
| 4,250,172 A | | 2/1981 | Mutzenberg et al. |
| 4,261,717 A | * | 4/1981 | Belore et al. .................. 96/112 |
| 4,279,630 A | | 7/1981 | Nakamura et al. |
| 4,401,447 A | | 8/1983 | Huber |
| 4,409,950 A | | 10/1983 | Goldberg |
| 4,418,662 A | | 12/1983 | Engler et al. |
| 4,513,047 A | | 4/1985 | Leach et al. |
| 4,925,468 A | | 5/1990 | Kishi et al. |
| 5,076,821 A | * | 12/1991 | Bruhnke et al. ............... 96/130 |
| 5,129,929 A | | 7/1992 | Linnersten |
| 5,207,808 A | * | 5/1993 | Haruta et al. .................. 96/131 |
| 5,354,365 A | | 10/1994 | Youn |
| 5,466,516 A | | 11/1995 | Lutzow et al. |
| 5,486,410 A | | 1/1996 | Groeger et al. |
| 5,609,761 A | | 3/1997 | Franz |
| 5,620,505 A | | 4/1997 | Koch et al. |
| 5,722,358 A | | 3/1998 | Fuesser et al. |
| 5,879,423 A | | 3/1999 | Luka et al. |
| 5,912,368 A | * | 6/1999 | Satarino et al. ............... 55/320 |
| 6,152,996 A | | 11/2000 | Linnersten et al. |
| 6,200,368 B1 | | 3/2001 | Guerin et al. |
| 6,374,811 B1 | | 4/2002 | Mancini |
| 6,383,268 B2 | * | 5/2002 | Oda ............................ 96/134 |
| 6,432,179 B1 | | 8/2002 | Lobovsky et al. |
| 6,438,486 B1 | | 8/2002 | Mancini |
| 6,440,200 B1 | | 8/2002 | Sakakibara et al. |
| 6,464,761 B1 | | 10/2002 | Bugli |
| 6,474,312 B1 | | 11/2002 | Zulauf et al. |
| 6,505,610 B2 | * | 1/2003 | Everingham et al. ....... 123/516 |
| 6,565,627 B1 | | 5/2003 | Golden et al. |
| 6,592,655 B2 | * | 7/2003 | Iriyama et al. ............... 96/138 |
| 6,637,415 B2 | | 10/2003 | Yoshioka et al. |
| 6,679,228 B1 | | 1/2004 | Confer et al. |
| 6,692,551 B2 | | 2/2004 | Wernholm et al. |
| 6,692,554 B1 | * | 2/2004 | Leffel et al. .................. 96/108 |
| 6,692,555 B2 | * | 2/2004 | Oda et al. ..................... 96/134 |
| 6,698,403 B2 | | 3/2004 | Honda et al. |
| 6,699,310 B2 | * | 3/2004 | Oda et al. ..................... 96/132 |
| 6,736,871 B1 | | 5/2004 | Green et al. ............... 55/385.3 |
| 6,752,859 B2 | | 6/2004 | LaBarge et al. |
| 6,810,861 B2 | * | 11/2004 | Itakura et al. ............... 123/516 |
| 6,817,345 B2 | | 11/2004 | Lawrence ................... 123/518 |
| 6,835,237 B2 | | 12/2004 | Ishida ......................... 96/135 |
| 6,913,001 B2 | | 7/2005 | Abdolhosseini et al. .... 123/519 |
| 2002/0029693 A1 | * | 3/2002 | Sakakibara et al. ........... 96/134 |
| 2002/0043156 A1 | | 4/2002 | Shea ........................... 96/134 |
| 2002/0059920 A1 | * | 5/2002 | Yoshioka et al. ........... 123/518 |
| 2002/0083838 A1 | | 7/2002 | Incorvia et al. |
| 2003/0116021 A1 | | 6/2003 | Oda et al. |
| 2003/0145726 A1 | | 8/2003 | Gueret et al. |
| 2003/0145732 A1 | * | 8/2003 | Leffel et al. .................. 96/134 |
| 2003/0183083 A1 | | 10/2003 | Hau-Cheng Fu et al. |
| 2003/0192512 A1 | * | 10/2003 | Luley et al. ................. 123/519 |
| 2003/0196644 A1 | * | 10/2003 | Braun et al. ................. 123/518 |
| 2004/0011197 A1 | * | 1/2004 | Wernholm et al. ............. 95/90 |
| 2004/0050252 A1 | | 3/2004 | Wernholm et al. |
| 2004/0065197 A1 | | 4/2004 | LaBarge et al. |
| 2004/0079344 A1 | * | 4/2004 | Gimby et al. ................ 123/519 |
| 2004/0083894 A1 | * | 5/2004 | Koyama et al. ............... 96/133 |
| 2004/0099253 A1 | | 5/2004 | Tschantz ..................... 123/518 |
| 2004/0118387 A1 | * | 6/2004 | Lawrence ................... 123/518 |
| 2004/0131512 A1 | | 7/2004 | Abe et al. ................... 422/180 |
| 2004/0226440 A1 | | 11/2004 | Foong et al. ................. 95/146 |
| 2004/0250680 A1 | | 12/2004 | Wright ........................ 96/108 |
| 2004/0255911 A1 | | 12/2004 | Abdolhosseini et al. .... 123/518 |
| 2005/0000362 A1 | | 1/2005 | Bause et al. ................... 96/134 |
| 2005/0126395 A1 | | 6/2005 | Blackburn et al. ............ 96/108 |
| 2005/0145224 A1 | | 7/2005 | Zulauf et al. ............... 123/518 |

OTHER PUBLICATIONS

Written Opinion of the International Searching Authority for PCT/US2005/030779 dated Jul. 13, 2006.

Office action dated Apr. 6, 2006 for U.S. Appl. No. 10/806,942 filed Mar. 23, 2004.

U.S. Appl. No. 10/927,383 filed Aug. 26, 2004, pending.

United States Patent and Trademark Office Office Action dated Jan. 12, 2005 for U.S. Appl. No. 10/806,942 filed Mar. 23, 2004.

United States Patent and Trademark Office Office Action dated Jun. 10, 2005 for U.S. Appl. No. 10/806,942 filed Mar. 23, 2004.

European Office Action dated Dec. 7, 2005 for European application No. 04 757746.5–2113.

International Search Report for S.N. PCT/US2004/008031 dated Aug. 19, 2004 (12 pages).

* cited by examiner

EVAPORATIVE EMISSIONS FILTER

BACKGROUND OF THE INVENTION

The present invention relates generally to filters, and more particularly to filters useful for adsorbing hydrocarbon vapors.

In internal combustion engines, while the engine is running, there is a constant flow of air through the air induction system into the intake manifold and finally into the combustion chamber through the intake valves. The airflow is caused by the intake stroke of the piston, which draws a vacuum on the intake manifold. This creates an imbalance of pressures between the intake manifold and the environment, and thus air rushes in through the air induction system. Due to the low internal pressure in the intake manifold and the constant airflow into the engine, there are no evaporative emissions from the intake manifold or air induction system.

Further, when a modern, fuel injected engine is running, the fuel system maintains the fuel in the fuel rail(s) at sufficient pressure to prevent the vaporization of the fuel even though the fuel rail(s) may be at a temperature sufficient to vaporize the fuel at normal atmospheric pressure. In fact, good restarting in part may depend on maintaining fuel rail pressure for a number of hours after shut down until the engine cools to prevent fuel vaporization in the fuel rail(s). Fuel vapor in the fuel rail(s) is generally undesirable in that it may lead to long crank times during engine start up.

After engine shut-down, air continues to rush through the air induction system until the intake manifold vacuum is eliminated. Evaporative hydrocarbons may be emitted if the pressurized fuel in the fuel rail(s) leaks into the intake manifold through the fuel injectors. This small amount of fuel may vaporize, and the hydrocarbon vapor may migrate out of the intake manifold through the air induction system to the atmosphere. Heretofore such hydrocarbon vapor egress was considered negligible. However, current regulations in the state of California, as well as in other U.S. states, restrict evaporative emissions from fuel to virtually zero.

Attempts to solve the problem of evaporative hydrocarbon emissions have included placing secondary, hydrocarbon adsorbing filters within the direct air flow path. However, such filters generally add restriction to the air induction system. As such, the engine is generally less efficient, or the air induction system may need to be sized larger in order to provide the same mass airflow with the increased restriction.

Other attempts have included combining hydrocarbon vapor-adsorbing materials with a standard particulate/contaminant air filter. Some drawbacks associated with these combination filters include the possibility of vapor-adsorbing material flaking out of the filter and entering the air system. The loss of adsorbent material may deleteriously affect the vapor adsorbence of the filter.

SUMMARY OF THE INVENTION

The present invention substantially solves the drawbacks enumerated above by providing an evaporative emissions filter for an engine air induction system. The evaporative emissions filter includes a hydrocarbon vapor-adsorbent member disposed within the air induction system. A mechanism is provided for mounting the evaporative emissions filter within the air induction system. Hydrocarbon vapors present in the air induction system after engine shut-down are substantially retained in the adsorbent member until air flows through the air induction system after the engine starts.

BRIEF DESCRIPTION OF THE DRAWINGS

Objects, features and advantages of the present invention will become apparent by reference to the following detailed description and drawings, in which.

DETAILED DESCRIPTION OF THE EMBODIMENTS

Figure 1:
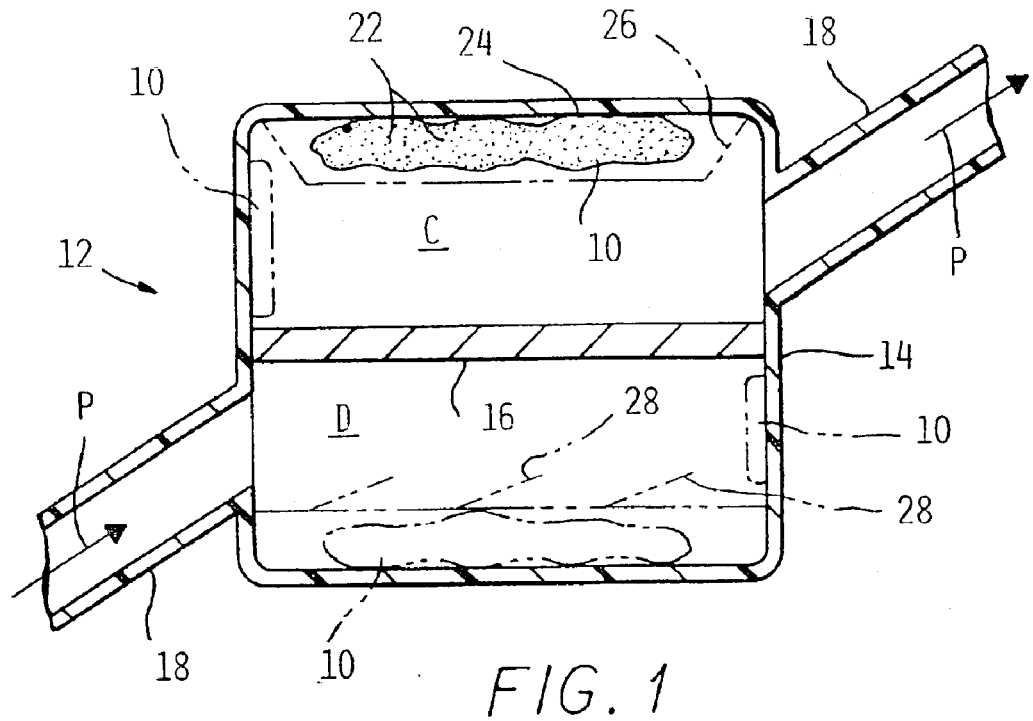
FIG. 1 is a cut away, cross-sectional view of an air filter housing showing an embodiment of the present invention therein.

It would be desirable to substantially prevent evaporative hydrocarbon emissions from escaping into the atmosphere in order to meet regulations and to become more environmentally friendly. It would further be desirable to achieve such substantial prevention without restricting airflow through the air induction system. Yet further, it would be desirable to achieve this goal relatively inexpensively. It would further be desirable to achieve this goal with a lower likelihood of fouling the adsorbent material compared to a barrier filter. The evaporative emissions filter of the present invention substantially meets the above-mentioned goals. Referring now to FIG. 1, the evaporative emissions filter of the present invention is designated generally as 10. The evaporative emissions filter 10 is useful for an engine air induction system 12 having a direct air flow path (arrow P). Air induction system 12 includes a housing/airbox 14 containing a conventional air filter 16. Air filter 16 filters out contaminants in air entering the engine (not shown). Air filters 16 generally have as a main constituent thereof pleated paper housed in a flexible, semi-rigid, or rigid frame. The air filter 16 is mounted within the housing 14, and generally is used once and discarded. Air induction tube 18 carries air from outside the vehicle to the housing/airbox 14 and then to the engine via the intake manifold (not shown).

Figure 2:
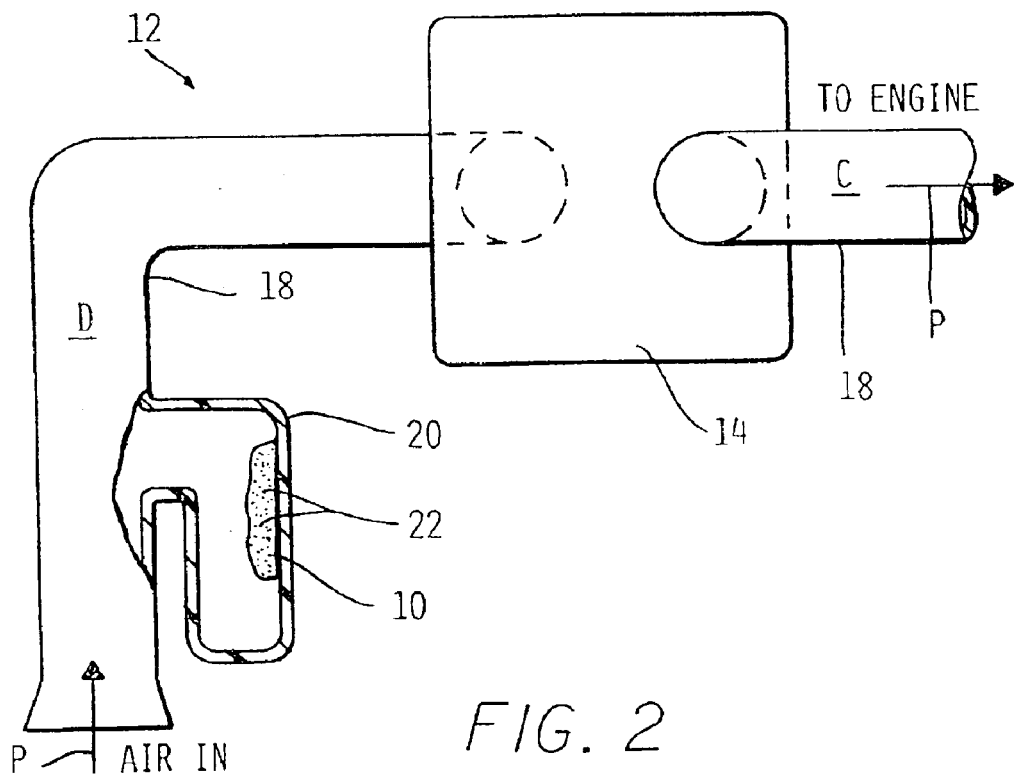
FIG. 2 is a partially cut away, cross-sectional top view of an air induction system showing a further embodiment of the present invention therein.

Referring also to FIG. 2, air induction system 12 may optionally include an air resonator 20. The air resonator 20 may be attached to, and in fluid communication with the air induction tube 18 (as shown) and/or the housing 14. It is to be understood that if the optional air resonator 20 is used, it is believed that the evaporative emissions filter 10 of the present invention will work substantially equally well whether the air resonator 20 is on the clean side C or dirty side D of the air induction tube 18, or attached to and/or integral with the clean side C or dirty side D of housing 14.

The evaporative emissions filter 10 comprises a hydrocarbon vapor-adsorbent member 22 disposed within the air induction system 12 substantially outside of the direct air flow path P. Evaporative emissions filter 10 may further include a mechanism 24 for mounting the evaporative emissions filter 10 within the air induction system 12. It is to be understood that mechanism 24 may include any suitable fasteners, including but not limited to adhesives, hook and loop fasteners, screws, rivets, fasteners that employ ultrasonic or friction welding, flexible tabs that snap the filter 10 in, and the like. Further, the evaporative emissions filter 10 may be mounted to the airbox 14 in such a way that it is mounted off the flat surface (stand-offs) in order to maximize the amount of the adsorbent member 22 exposed to the evaporative emissions.

If hydrocarbon vapors are present in the air induction system after engine shut-down, the vapors are substantially retained in the adsorbent member 22 until air flows through the air induction system 12 after the engine starts. The return of air flow through the system 12 substantially regenerates the adsorbent member 22.

It is to be understood that evaporative emissions filter 10 of the present invention may be placed in any suitable area of the induction system 12 substantially outside of the direct flow path P. In an embodiment of the present invention, the filter 10 is mounted within the air resonator 20 and/or the air filter housing 14.

In an alternate embodiment of the present invention, the filter 10 is mounted within the air resonator 20 (as seen in FIG. 2).

In a further embodiment of the present invention, the filter 10 is mounted within the air filter housing 14 on the clean air side C of the housing 14.

In yet a further embodiment of the present invention, the filter 10 is mounted within the air filter housing 14 on the dirty air side D of the housing 14 (as seen in FIG. 1).

Still further, in an embodiment of the present invention, one evaporative emissions filter 10 is mounted within the air filter housing 14 on the clean air side C of the housing 14, and a second filter 10 (a second, third and fourth filter 10 is shown in phantom in FIG. 1) is mounted within the air filter housing 14 on the dirty air side D of the housing 14.

As shown in FIG. 1, in yet a further embodiment of the present invention, a filter 10 is mounted on at least three internal walls of the housing 14.

It is to be understood that the adsorbent member 22 may include any suitable hydrocarbon vapor-adsorbing material. In an embodiment of the present invention, examples of the hydrocarbon vapor-adsorbing material include, but are not limited to at least one of activated carbon, zeolites, cyclodextrins, hydrophobic cellulose, liquid phase absorbents (e.g. silicon oils), and/or mixtures thereof. In a non-limitative embodiment of the present invention, the adsorbent member 22 has as a main component thereof activated carbon. It is to be further understood that the hydrocarbon vapor-adsorbing material may be in any suitable form and housed/impregnated within any suitable media.

In an embodiment, the hydrocarbon-vapor adsorbing material may be contained by one or more fine mesh screens. It is to be understood that the fine mesh screen(s) may be formed from any suitable materials, including but not limited to polymeric materials, metal materials, and/or mixtures thereof. One non-limitative example of a suitable polymeric material is polyvinylidene chloride, commercially available from Dow Chemical in Midland, Mich. under the tradename SARAN.

Some non-limitative examples of carbon impregnated filtration structures are commercially available from AQF Technologies LLC in Charlotte, N.C. Other suitable non-limitative examples of adsorbent media are disclosed in U.S. Pat. No. 5,486,410, which is incorporated by reference herein in its entirety. The '410 patent discloses, among other embodiments, a filtration structure of a composite staple having a nylon sheath and a polyester core, with activated carbon particles bonded to the fiber matrix, and including a microfiber web located within the structure. Yet other suitable adsorbent media include activated carbon commercially available from PICA USA, Inc. in Columbus, Ohio.

It is further believed that wood based carbon may provide certain advantages, such as for example, in regeneration of the carbon bed.

In order to extend the life of the hydrocarbon vapor-adsorbent member 22, in some instances it may be desirable to protect evaporative emissions filter 10 with an optional protective member(s) such as a hinged flapper 26, louvres 28, a combination thereof, and/or the like. The flapper 26 and louvres 28 are each shown semi-schematically and in phantom in FIG. 1. The flapper 26 remains substantially closed when the engine is running, thereby substantially protecting adsorbent member 22 from water, debris and/or other contaminants. Flapper 26 then falls open when the engine is shut down in order to permit ingress of hydrocarbon vapors that may be present. The louvres 28 are designed so as to deflect water, debris and/or other contaminants away from adsorbent member 22.

Even without a separate protecting member 26, 28, the location of the present invention 10 outside of the direct flow path P, i.e. in a lower flow area, such as for example, in the airbox 14 or resonator 20, results in less stress and less contamination of the adsorbent member 22 (compared to a barrier filter), thus leading to longer life of the evaporative emissions filter 10.

A method according to an embodiment of the present invention for adsorbing hydrocarbon vapors from an automotive engine air induction system 12 after engine shut-down, includes the step of operatively placing the evaporative emissions filter 10 substantially outside of the direct air flow path P and within at least one of the air resonator 20 and the air filter housing 14, the evaporative emissions filter 10 including hydrocarbon vapor-adsorbent member 22. Hydrocarbon vapors present in the air induction system 12 after engine shut-down are substantially retained in the adsorbent member 22 until air flows through the air induction system 12 after the engine starts.

To further illustrate the present invention, the following examples are given. It is to be understood that these examples are provided for illustrative purposes and are not to be construed as limiting the scope of the present invention.

EXAMPLES

In alternate trials, A) 36 grams of activated carbon impregnated filter media obtained from AQF Technologies LLC were placed on the top inner surface (clean side) of airbox 14; B) 12 grams of the AQF activated carbon were placed on each of three inner sides of airbox 14: top, and opposed sides of the clean side (similar to a saddle) for a total of 36 grams of activated carbon; C) 36 grams of activated carbon obtained from PICA USA, Inc. and held between two layers of a fine mesh screen were placed on the top inner surface (clean side) of airbox 14; and D) 18 grams of the AQF activated carbon were placed on the top inner surface (clean side) and on the bottom inner surface (dirty side) of the airbox 14, for a total of 36 grams of activated carbon. In each of the alternate trials, 1.5 grams of gasoline vapor were allowed to enter the air induction system 12. In each of the four trials, less than about 0.006 grams of hydrocarbon vapor was emitted to the atmosphere, as compared to the control (no adsorbent media) in which almost 0.04 grams of hydrocarbon vapor was emitted to the atmosphere. Of the four trials, it appeared that trial D was more successful in preventing escape of evaporative hydrocarbon emissions.

The present invention is further advantageous in that an effective amount of adsorbent media/member 22 may be calculated for an expected amount of hydrocarbon vapor. As such, that effective amount of adsorbent member 22 may be placed within the air induction system 12 to adsorb that expected amount of hydrocarbon vapor.

While several embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. An evaporative emissions filter for an engine air induction system having a direct air flow path, the air induction system including a housing containing an air filter, the evaporative emissions filter comprising:
   a hydrocarbon vapor-adsorbent member disposed within the air induction system substantially outside of the direct air flow path, and disposed above the direct air flow path, wherein the hydrocarbon vapor-adsorbent member is disposed only on a portion of a section of the air induction system defining the direct air flow path; and
   a fastener for mounting the evaporative emissions filter within the air filter housing;
   wherein hydrocarbon vapors present in the air induction system after engine shut-down are substantially retained in the adsorbent member until air flows through the air induction system after the engine starts.

2. The evaporative emissions filter as defined in claim 1 wherein the air induction system further comprises an air resonator that is attached to, and in fluid communication with at least one of an air induction tube and the housing, and wherein another evaporative emissions filter is mounted within the air resonator.

3. The evaporative emissions filter as defined in claim 1 wherein the evaporative emissions filter is mounted within the air filter housing on the clean air side of the housing.

4. The evaporative emissions filter as defined in claim 1 wherein the evaporative emissions filter is mounted within the air filter housing on the dirty air side of the housing.

5. The evaporative emissions filter as defined in claim 1, further comprising a second evaporative emissions filter, wherein the evaporative emissions filter is mounted within the air filter housing on the clean air side of the housing, and the second evaporative emissions filter is mounted within the air filter housing on the dirty air side of the housing.

6. The evaporative emissions filter as defined in claim 1, further comprising at least two additional evaporative emissions filters, wherein one of the evaporative emissions filters is mounted on at least three internal walls of the housing.

7. The evaporative emissions filter as defined in claim 1 wherein the adsorbent member has as a main component thereof a hydrocarbon vapor-adsorbing material comprising at least one of activated carbon, zeolites, cyclodextrins, hydrophobic cellulose, liquid phase absorbents, and mixtures thereof.

8. The evaporative emissions filter as defined in claim 7 wherein the hydrocarbon vapor-adsorbing material is activated carbon.

9. The evaporative emissions filter as defined in claim 1, further comprising a member for protecting the hydrocarbon vapor-adsorbent member from at least one of water and contaminants while the engine is running.

10. The evaporative emissions filter as defined in claim 9 wherein the protecting member is at least one of a hinged flapper and louvres.

11. An air induction system for an internal combustion engine, the air induction system having a direct air flow path, the system comprising:
    an air filter;
    a housing containing the air filter; and
    an evaporative emissions filter, comprising:
        a hydrocarbon vapor-adsorbent member disposed within the air induction system substantially outside of the direct air flow path, and disposed above the direct air flow path, wherein the hydrocarbon vapor-adsorbent member is disposed only on a section of the air induction system defining the direct air flow path, wherein the adsorbent member is mounted within the air filter housing; and
        a fastener for mounting the evaporative emissions filter within the air filter housing;
        wherein hydrocarbon vapors present in the air induction system after engine shut-down are substantially retained in the adsorbent member until air flows through the air induction system after the engine starts.

12. A method for adsorbing hydrocarbon vapors from an automotive engine air induction system after engine shut down, the system having a direct air flow path and including a housing containing an air filter, the method comprising the step of:
    operatively placing an evaporative emissions filter substantially outside of the direct air flow path, and disposed above the direct air flow path, and within the air filter housing, wherein the hydrocarbon vapor-adsorbent member is disposed only on a portion of a section of the air filter housing defining the direct air flow path and the evaporative emissions filter comprising a hydrocarbon vapor-adsorbent member, wherein hydrocarbon vapors present in the air induction system after engine shut-down are substantially retained in the adsorbent member until air flows through the air induction system after the engine starts.

13. The method as in claim 12, wherein the hydrocarbon vapor adsorbent member comprises activated carbon disposed between two layers of a fine mesh screen.

14. The method as in claim 13, wherein the hydrocarbon vapor adsorbent member comprises less than 37 grams of activated carbon and wherein approximately 99.6 percent of 1.5 grams of gasoline vapor released into the air induction system is retained therein after engine shut down.

15. The evaporative emissions filter as in claim 1, wherein the hydrocarbon vapor adsorbent member comprises activated carbon disposed between two layers of a fine mesh screen.

16. The evaporative emissious filter as in claim 15, wherein the hydrocarbon vapor adsorbent member comprises less than 37 grams of activated carbon and wherein approximately 99.6 percent of 1.5 grams of gasoline vapor released into the air induction system is retained therein after engine shut down.

17. The air induction system as in claim 11, wherein the hydrocarbon vapor adsorbent member comprises activated carbon disposed between two layers of a fine mesh screen.

18. The air induction system as in claim 17, wherein the hydrocarbon vapor adsorbent member comprises less than 37 grams of activated carbon and wherein approximately 99.6 percent of 1.5 grams of gasoline vapor released into the air induction system is retained therein after engine shut down.

* * * * *